(No Model.)
L. M. STEGNER.
GARDEN CULTIVATOR.
No. 508,995. Patented Nov. 21, 1893.
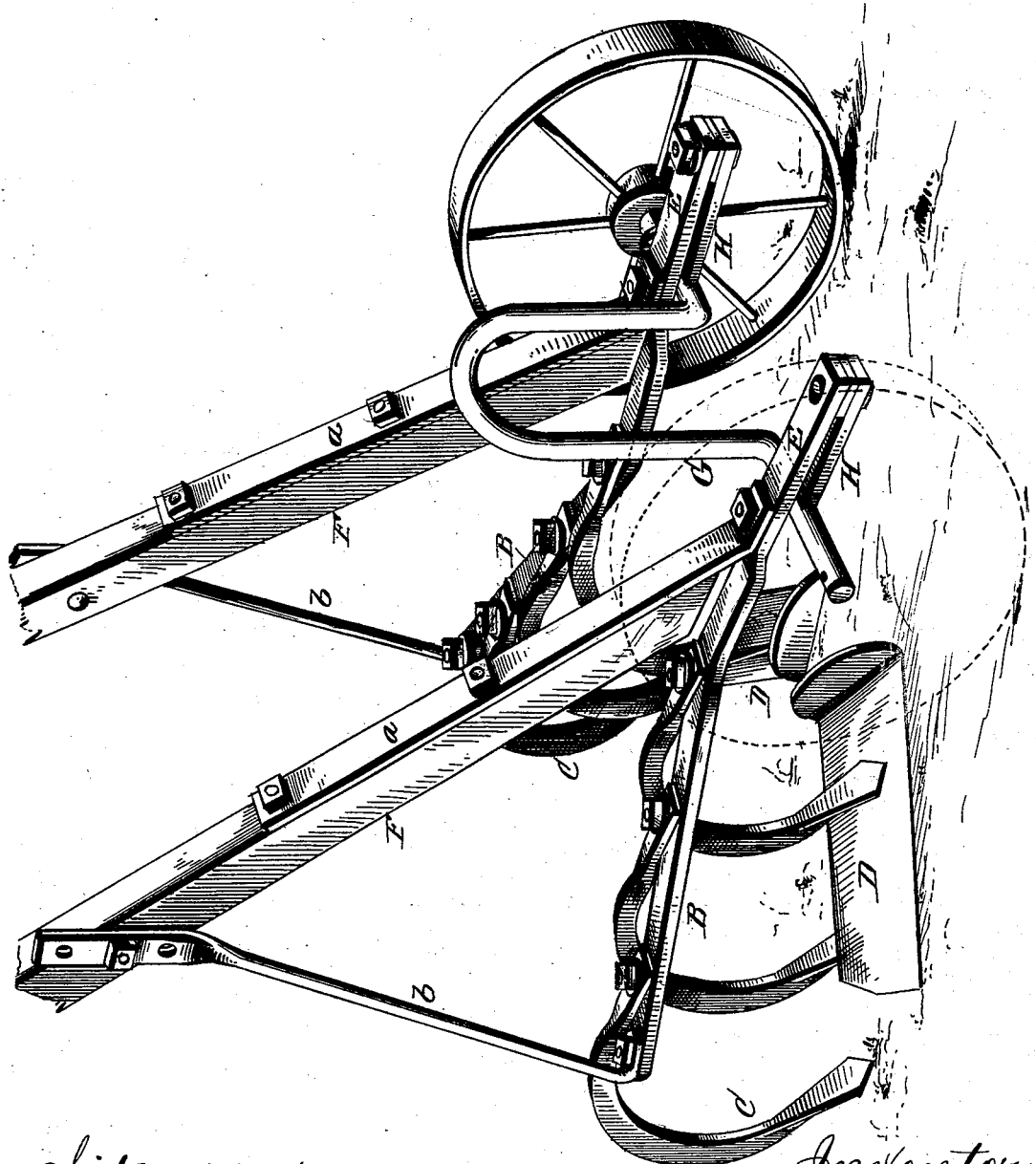
Witnesses
G. J. Williamson
W. Ælegard
Inventor
Louis M. Stegner
per Chas. H. Fowler
Attorney.

UNITED STATES PATENT OFFICE.

LOUIS M. STEGNER, OF LEBANON, INDIANA.

GARDEN-CULTIVATOR.

SPECIFICATION forming part of Letters Patent No. 508,995, dated November 21, 1893.

Application filed June 28, 1893. Serial No. 479,011. (No model.)

*To all whom it may concern:*

Be it known that I, LOUIS M. STEGNER, a citizen of the United States, residing at Lebanon, in the county of Boone and State of Indiana, have invented certain new and useful Improvements in Garden-Cultivators; and I do hereby declare that the following is a full, clear, and exact description of the same, reference being had to the annexed drawings, making a part of this specification, and to the letters of reference marked thereon.

The present invention has for its object to provide a cultivator that is adapted for garden and other purposes, that will be simple in construction and one in which the beams thereof may be extended to either the right or left by the operator while the cultivator is in use, thus keeping it adjusted to the row and enabling the adjustment to be made at will while the cultivator is in operation. The above object I attain by the construction substantially as shown in the drawing and hereinafter described and claimed.

The accompanying drawing represents a perspective view of a cultivator constructed in accordance with my invention, one of the wheels being shown in dotted lines and the handles of the cultivator partly broken away. The beams B have connected to them the usual teeth C and shovels D of any suitable construction and attached to the beams in any desirable manner. The beams B have forwardly extending arms E to which the handles F are connected by means of the braces *a* and suitable bolts and nuts or other like fastenings. The rear ends of the beams are connected with the handles by means of the braces *b* and suitable bolts and nuts, and may be adjustable to adapt the braces to the distance between the handles and beams. The arch-shaped axle G has forwardly extending clips H which are rigid upon the axle, either by forming the clips with the axle or attaching them thereto in any well known manner. The extending arms E of the beams are pivotally connected to the clips by means of bolts and nuts or by any other well known means that will form a pivotal connection between the two. The beams B and the extending arms E are at an angle with each other, and by means of the arms the beams are in reality extended so that their sweep will be greater when extended laterally to adjust the beams to the row. The pivotal connection between the extending arms and clips being forward of the axle any slight movement either to the right or left at the pivotal connection will be multiplied at the rear ends of the beams to render the adjustment sufficient for the purpose intended. The cultivator will straddle the row and work both sides at once and is easily adjusted thereto, the length of the beams keeping the shovels or teeth at almost the same angle when the beams are shifted in or out, and the handles are so connected as to utilize all the force.

Having now fully described my invention, what I claim as new, and desire to secure by Letters Patent, is—

The combination in a hand-cultivator of an arched-axle and wheels, the horizontal axle-arms having rigid clips or bars extending forwardly, shovel-beams with arms or extensions carrying the handles, said arms pivoted to the forward ends of the clips in advance of the axle and each gang having independent lateral movement on the axle, substantially as shown and described.

In testimony that I claim the above I have hereunto subscribed my name in the presence of two witnesses.

LOUIS M. STEGNER.

Witnesses:
HENRY C. WILLS,
LEVI LANE.